Feb. 13, 1945.  F. T. COURT  2,369,437
POWER LIFT
Filed Jan. 21, 1942  3 Sheets-Sheet 1
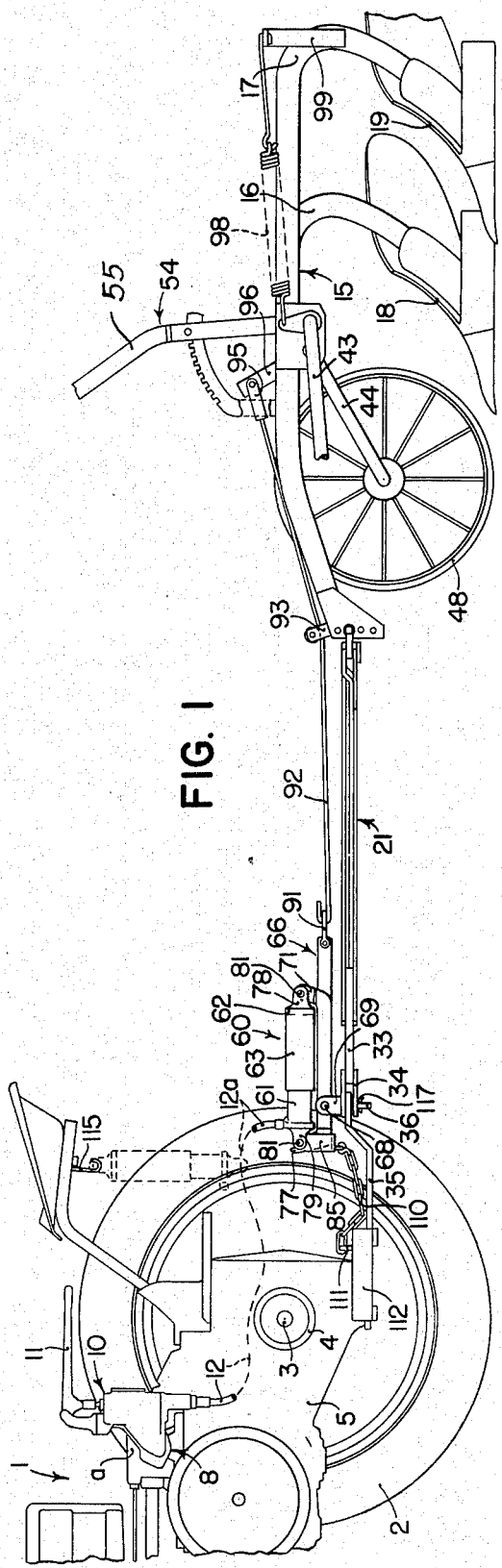
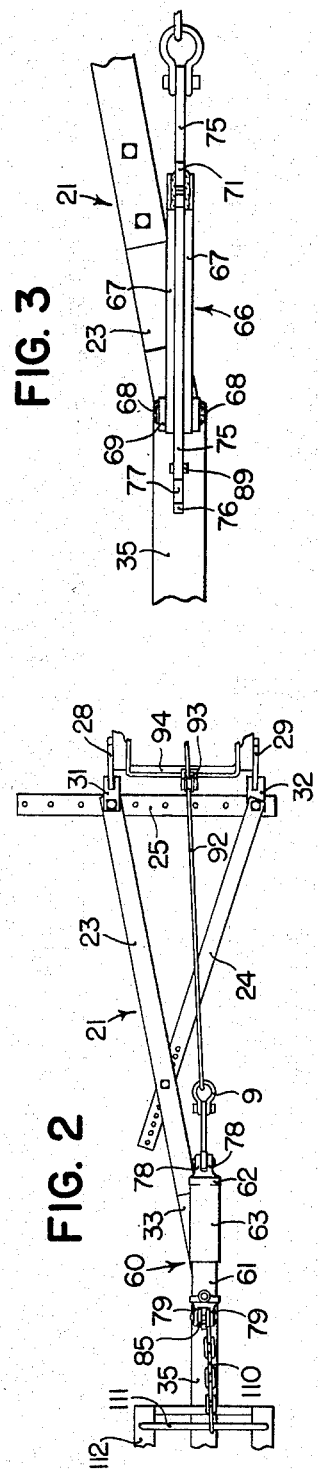
INVENTOR
FRANK T. COURT
BY
ATTORNEY Feb. 13, 1945. F. T. COURT 2,369,437
POWER LIFT
Filed Jan. 21, 1942 3 Sheets-Sheet 2
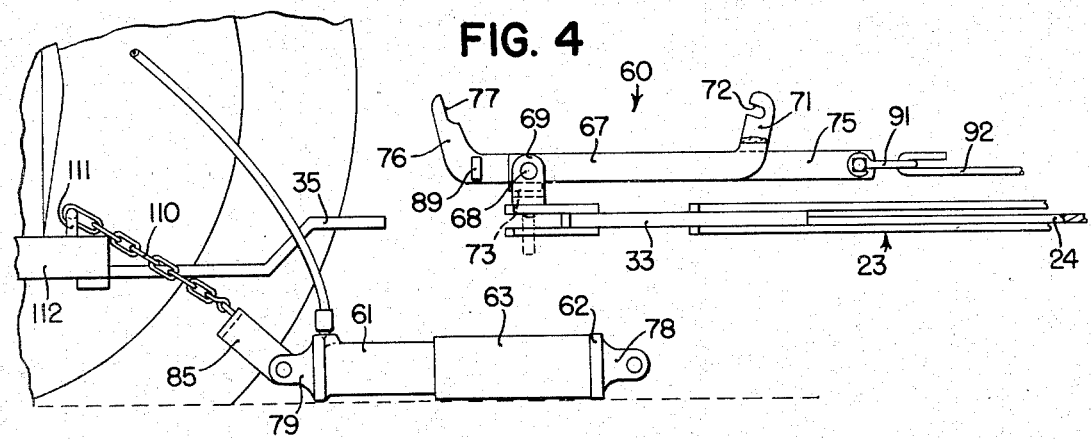
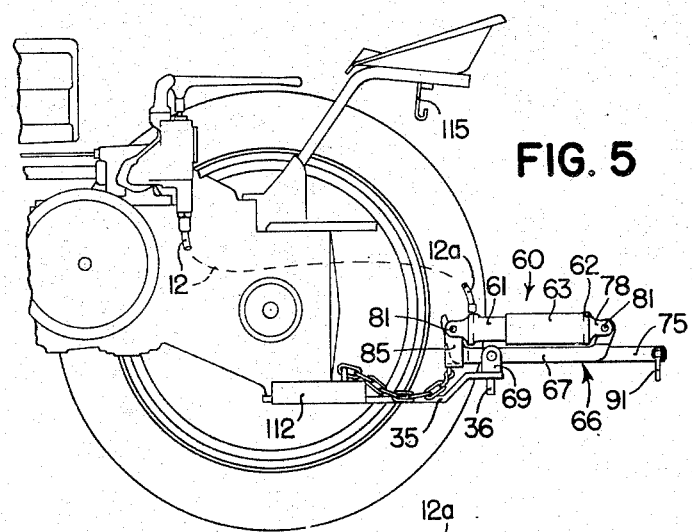
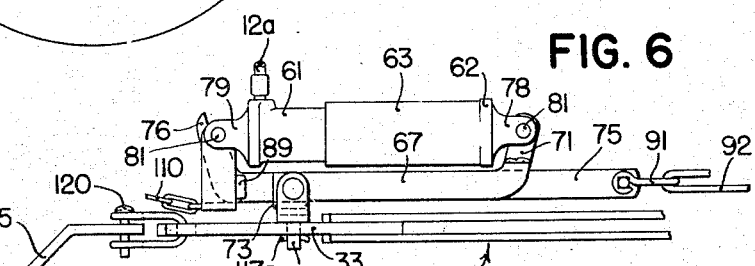
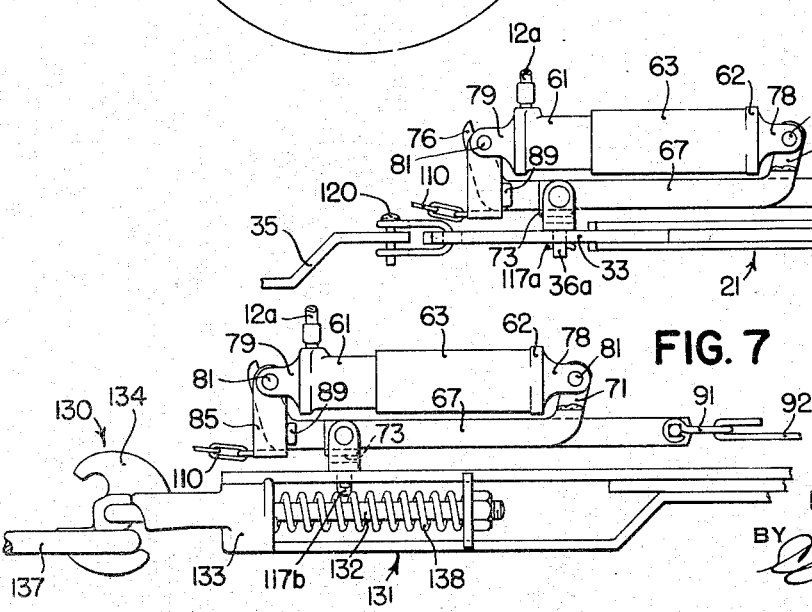
INVENTOR
FRANK T. COURT
BY
ATTORNEY Feb. 13, 1945. F. T. COURT 2,369,437
POWER LIFT
Filed Jan. 21, 1942 3 Sheets-Sheet 3
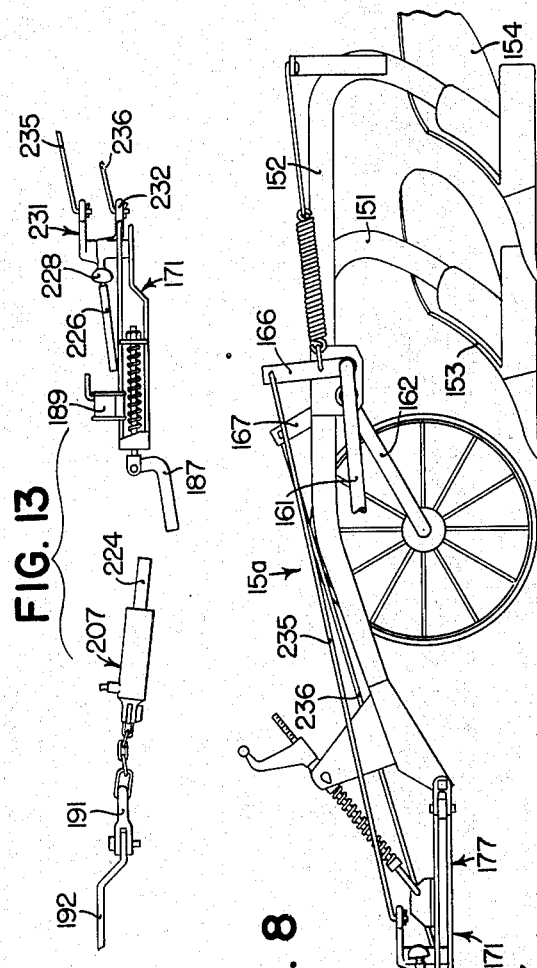
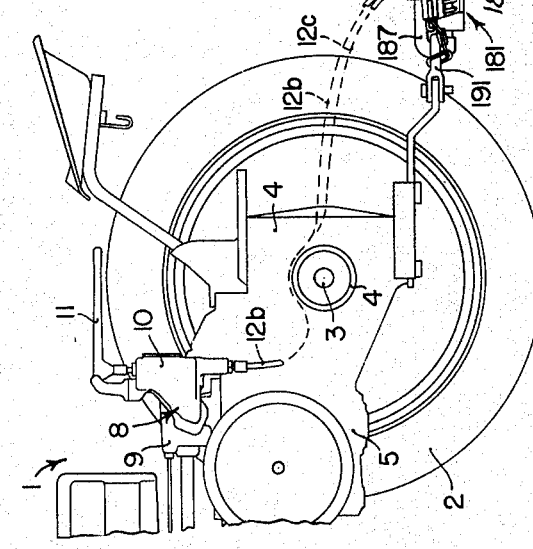
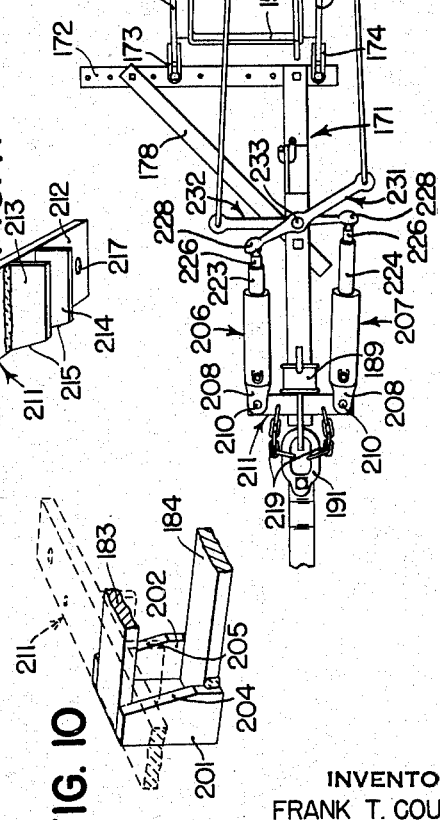
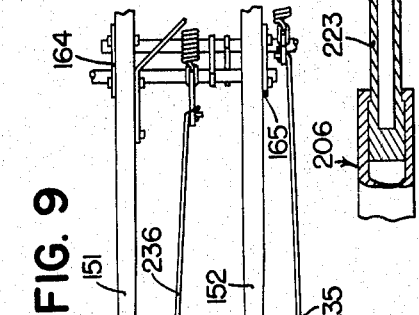
INVENTOR
FRANK T. COURT
ATTORNEY Patented Feb. 13, 1945

2,369,437

UNITED STATES PATENT OFFICE 2,369,437

POWER LIFT

Frank T. Court, Moline, Ill., assignor to Deere & Company, Moline, Ill., a corporation of Illinois Application January 21, 1942, Serial No. 427,541

17 Claims. (Cl. 97—50)

The present invention relates generally to agricultural implements and more particularly to tractor and implement combinations. More particularly, the present invention is concerned with power actuated apparatus for controlling implements, especially those drawn by a tractor or the like, by power derived from the tractor.

The object and general nature of the present invention is the provision of a fluid pressure control for tractor propelled implements and the like of the towed or trailing type in which the controlling cylinder and piston unit is mounted on the implement but is so connected with the tractor that the unit is automatically released from the implement in the event the latter becomes disconnected from the tractor, as by the operation of a spring release trip device or by the breaking of a hitch pin, or the like. Also, the present invention contemplates means whereby the piston and cylinder unit remains connected with the tractor when for any reason the latter is driven forwardly away from the implement after the latter has become disconnected from the tractor. Thus, breakage of or damage to the hose connection from the source of fluid pressure on the tractor to the piston and cylinder unit is prevented.

It is a further feature of this invention to provide a quick detachable releasable connection between a pair of cylinder and piston units, both connected through hose connections or the like with a source of pressure on the tractor, with the implement having the parts which the two piston and cylinder units are normally adapted to control.

These and other objects and advantages of the present invention will be apparent to those skilled in the art after a consideration of the following detailed description of the preferred embodiments, taken in conjunction with the accompanying drawings.

In the drawings:

Figure 1 is a side view of a tractor propelled outfit in which the principles of the present invention have been incorporated;

Figure 2 is a fragmentary plan view of the hitch connection between the implement and tractor shown in Figure 1, illustrating in particular the mounting of the hydraulic piston and cylinder unit and its connection to the tractor;

Figure 3 is an enlarged plan view of the carrier for the hydraulic piston and cylinder unit;

Figure 4 is a fragmentary side view showing the relation of the parts after the tractor has been driven forwardly away from the implement following the disconnection of the latter from the tractor as by the breakage of the hitch pin;

Figure 5 is a side view showing the support of the carrier and the cylinder and piston unit on the drawbar of the tractor;

Figure 6 is a fragmentary side view showing the use of the present invention with a break-pin hitch connection, and Figure 7 shows the use of the form of the invention shown in Figures 1-5 with a spring release coupling;

Figure 8 is a side view of a modified form of the present invention in which a mounting is provided for two separate hydraulic piston and cylinder units;

Figure 9 is a fragmentary plan view of the cylinder mounting and associated parts;

Figure 10 is a fragmentary perspective view of the front end of the implement hitch frame and the position of the cylinder carrying member with respect thereto when in normal operation;

Figure 11 is a perspective view looking toward the underside of the cylinder carrying member;

Figure 12 is a fragmentary view, partly in section, illustrating the detachable connection between each piston and cylinder unit and the associated implement controlling connections; and Figure 13 is a fragmentary side view illustrating the relation of the parts in the positions they occupy when the implement becomes disconnected from the tractor and the latter is driven forwardly sufficient to effect the release of the piston and cylinder units from the implement.

Referring now to the drawings, particularly Figures 1 and 2, the reference numeral 1 indicates a tractor which is more or less of conventional construction and hence has been illustrated only fragmentarily. The tractor 1 includes rear drive wheels 2 fixed to drive axles 3 that are journaled for rotation in a rear axle housing 4. The latter is secured to or forms a part of a transmission housing 5. The tractor 1 is equipped with a controlled source of fluid pressure, indicated in its entirety by the reference numeral 8 and which comprises a fluid pump driven from the shaft of the tractor governor 9 and suitable controlling valve mechanism 10 which is actuated by a valve lever 11. A fluid conduit in the form of a flexible hose connection 12 extends from the power unit 8 to a point of utilization. The present invention is not especially concerned with the particular details of the power unit 8, the same being preferably of the same construction as shown in the co-pending application of Jay D. Johnson, Serial No. 398,539, filed June 18, 1941, now United States Patent No. 2,340,474, issued February 1, 1944, to which reference may be made if necessary. Further description is therefore unnecessary except to point out that moving the valve lever 11 upwardly causes fluid to be forced outwardly through the conduit 12 under pressure. Releasing the lever 11 locks the fluid in the conduit 12 and associated connections, and depressing the lever 11 permits fluid to flow back into the power unit 8.

The present invention is particularly concerned with the provision of means for mounting a piston and cylinder unit or ram unit, permanently connected with the tractor 1 and its power unit 8, in detachable and releasable connection with an implement that itself is releasably connected with the tractor, either to accommodate disconnecting the implement from the tractor, a disconnection of the implement from the tractor upon the occurrence of an abnormal overload, or for other reasons. The present invention contemplates utilizing a control of this kind for any kind of implement, but to illustrate the principles of the present invention I have chosen to show an implement of the ground working type, namely, a plow which is indicated in its entirety by the reference numeral 15. The plow 15 as illustrated is of the two bottom towed type and includes a pair of plow beams 16 and 17 to the lower rear ends of which plow bottoms 18 and 19 are connected in the usual way. The beams 16 and 17, with associated parts, form the frame or frame means of the plow. The forward ends of the beams 16 and 17 are connected to a vertically swingable hitch, indicated in its entirety by the reference numeral 21, which may be considered as a part of the plow 15 as a whole. The hitch 15 includes a longitudinal draft member 23 and a diagonal brace 24, to the rear ends of both of which a transverse bar 25 is connected. Draft brackets 28 and 29 are connected to the forward ends of the plow beams 16 and 17 and are connected, respectively, by clevises 31 and 32 to the transverse hitch bar 25, the latter member having a plurality of openings therein to receive the clevises 31 and 32 in different positions of lateral adjustment as may be required. A drawbar extension 33 is bolted to the longitudinal draft member 23 and at its forward end receives a clevis 34 that is connected to the drawbar 35 of the tractor by a pivot pin 36.

A pair of crank axles 43 and 44 are journaled for rocking movements in brackets 45 and 46 that are secured, respectively, to the plow beams 16 and 17. Each of the crank axles includes a laterally turned end upon which a ground wheel 48 is mounted. The ground wheel 48 shown in Figure 1 constitutes the right furrow wheel of the plow, and the other ground wheel (not shown) constitutes the land wheel of the plow. An arm is fixed to the central portion of the crank axle 43 while another arm is fixed to the central portion of the crank axle 44, and these arms are connected to swing together by an adjustable leveling linkage 54 by virtue of which both crank axles 43 and 44 swing together but the relation of one may be varied with respect to the other by changing the adjusting lever 55 that forms a part of the linkage 54. The present invention is not concerned with the particular details per se of the leveling linkage, and hence it is shown only fragmentarily in Figure 1, the leveling linkage being substantially the same as the levling linkage shown in U. S. Patent No. 2,344,123, issued March 14, 1944, to Theophilus Brown and myself.

The position of the crank axles 43 and 44 is controlled by the tractor hydraulic power unit 8 by mechanism which will now be described. A hydraulic cylinder and piston unit or ram unit, indicated in its entirety by the reference numeral 60, is connected to the rear end 12a of the flexible hose connection 12 and receives fluid under pressure from and is controlled by the unit 8 on the tractor. Briefly, the unit 60 includes a cylinder 61 and a piston 62 having a protecting sleeve 63 telescopically associated with the cylinder 61. The unit 60 is mounted on a carrier 66. As best shown in Figures 1 and 3, the carrier 66 includes a pair of strap members 67 connected by a pair of pivots 68 to a U-shaped bracket 69 fixed to the upper end of the pivot pin 36, thereby forming a part of the latter. Since the pin 36 is carried by the tractor drawbar 35 it may be considered that in this form of the invention the ram unit is carried by the tractor but in a way as to move with the implement as required. However, inasmuch as the carrier 66, in the event the pin 36 should break, is freed with the hitch 21 from connection with the tractor, it may be considered that the carrier 66, and the ram unit 60 so long as it is supported thereby, is a part of the implement. In both forms, however, it is to be noted that the ram or fluid pressure responsive unit is connected in detachable relationship relative to the tractor. The strap members 67 are spaced apart laterally and extend rearwardly, terminating in upturned ends to which a ram-receiving lug 71 is fixed, as by welding. The lug 71 has a downwardly and rearwardly inclined open end slot 72 formed therein. The front ends of the strap members 67 are connected together by a transverse plate 73 which is welded to the lower edges of the strap members 67. A longitudinally extending strap 75 is disposed for sliding movement between the strap members 67, being guided in such sliding movement by the connecting plate 73 and the lower edge of the lug 71. The front end of the slidable strap member 75 is formed with a ram-receiving lug 76 spaced longitudinally of the other lug 71. The front lug 76 is provided with a slot or recess 77 (Figure 4). The hydraulic cylinder and piston unit 60 is provided with two pairs of attaching ears 78 and 79, each pair being apertured and carrying a pivot pin 81. The attaching ears 78 and 79 are spaced apart a distance slightly greater than the thickness of the lugs 71 and 76, and the slots or notches 72 and 77 are adapted to receive the attaching pins 81, the rear pin being adapted to be seated in the downwardly and rearwardly inclined slot 72 whereby so long as the front pin 81 remains seated in the notch 77 of the front lug 76, the unit 60 is held in position.

The means for holding the ram unit 60 in place includes a U-shaped latch member 85 swingably mounted on the front pin 81 and is so constructed that when the ram 60 is in position, the latch or U-shaped member 85 is swingable into a position (Figure 1) embracing the front end of the slidable member 75 and coacting therewith to prevent the front end of the ram 60 from raising out of the notch 77, and since the front end of the ram unit 60 is held in position the rear end will also be held in attached relation with the rear ram receiving lug 71. Since the strap members 67 and 75 are mounted on the pin 36, and since they form the major parts of the ram carrier 66, the cylinder unit 60 is adapted to swing laterally as may be required. The strap members 67 constitute anchoring means, since they are prevented by virtue of their attachment to the pivot pin 36 from moving longitudinally of the implement, and therefore when fluid is forced into the ram unit 60, the latter is extended and the strap member 75 shifted longitudinally forwardly between the other strap members 67. The rear end of the strap member 75 is apertured to receive a clevis member 91 to which the forward end of a longitudinally shiftable rod 92 is connected. Preferably, the front end of the slide bar 75 has a stop 89 to limit the rearward swinging of the latch member 85. The front end of the rod 92 is formed as a hook to engage the clevis 91. The rod 92 passes through a guide sheave 93, fixed to the plow in any suitable manner, preferably as by being bolted to a transverse brace 94 connecting the front ends of the plow beams 16 and 17, and the rear end of the rod 92 is connected through a clevis 95 to an arm 96 the lower end of which is fixed to the central portion of the crank axle 44. Thus, when fluid is forced into the ram 60, the slidable member 75 and the rod member 92 are shifted forwardly, thus swinging the crank axle 44 downwardly. The slidable member 75 and the rod member 92, in swinging the crank axle 44 downwardly, act in tension, and may therefore be considered as tension means, and the crank axle 44 constitutes one part of the implement that is movably mounted and is adapted to be actuated by the ram 60. Since both of the crank axles 43 and 44 swing together through the leveling linkage 54, extension of the piston and cylinder unit 60 acts through the crank axles 43 and 44 and associated ground wheels to raise the plow, and as long as the fluid is locked within the ram unit 60, the plow is held in its raised position. The plow may be lowered into operating position by releasing the fluid from the ram unit 60 and permitting the fluid to flow back to the power unit 8 on the tractor through the hose connection 12. Thus, the operator on the tractor may raise and lower the plow as desired merely by operating the valve lever 11. Ordinarily, the weight of the plow bottoms and the suction are sufficient to cause the fluid to be forced out of the ram unit 60 and back to the power unit on the tractor whenever the valve lever 11 is moved to lowering position. However, preferably I provide an auxiliary spring 98, connected between a bracket 99 on the plow and the bracket 52 on the crank axle 44. The spring 98 is thus effective to shift the member 75 rearwardly, thus forcing the oil in the ram unit 60 back to the unit 8 on the tractor.

In an arrangement as just described, it will be noted that the implement 15 carries a fluid pressure unit 60, deriving operating energy from the source of pressure on the tractor, for controlling an implement part, such as the supporting wheel structure of the plow, whereby the raising or lowering of the latter is easily effected merely by operating a valve. The provision of means for supporting the ram unit so as to move as a whole with the implement, the ram unit being connected through a flexible hose connection with the source of pressure on the tractor, makes it possible to have simple direct connections from the piston and cylinder unit back to the implement part or parts to be controlled. However, if it should occur that the implement hitch connection with the tractor becomes broken or otherwise ineffective, it is possible that the farmer may not be able to stop the tractor in time to prevent breaking the hose connection or otherwise damaging it. According to the principles of the present invention, means is provided whereby the ram unit remains at all times with the tractor, even though the implement should become disconnected from the tractor, as by breakage of the pivot pin, thus protecting the hose connection against damage. Briefly, this is accomplished by providing a quick detachable releasable connection for mounting on the implement to receive the ram unit and then connecting the latter by a connection between the ram unit and the tractor which is normally permanent. Referring now particularly to Figures 1 and 4, a chain 110 is connected at its front end to a laterally extending rod bracket 111, carried on the tractor drawbar support 112, and at its rear end is pivotally connected to the lower end of the U-shaped latch member 85. The chain 110 is of sufficient length to permit the U-shaped member 85 normally to be disposed in depending relation from the front pivot 81 and embracing the front end of the slidable member 75, which thus holds the ram unit 60 in place on the lugs 71 and 76. Also, the chain 110 is of sufficient length to permit the implement to swing from one side to the other without pulling the latch member 85 out of position. This is aided by the ability of the front end of the chain 110 to slide from one end to the other of the lateral rod bracket 111. However, in the event that the implement becomes disconnected from the tractor, as by the pin 26 breaking, the implement of course stops but the continued forward movement of the tractor tightens the chain 110 and causes the latter to swing the U-shaped latch member 85 forwardly away from the end of the slide 75. A pull is then exerted through the chain 110 and the member 85 against the front end of the ram unit 60, and since the notch or recess 77 inclines upwardly and forwardly, like the notch or slot 72, the pull exerted through the chain 110 and the member 85 draws the ram unit 60 out of the carrier 66, thus simultaneously disconnecting the ram unit 60 from its support and its connection with the shiftable part or parts of the implement. The chain 110 thus serves as an anchoring connection for anchoring, or permanently connecting, the ram 60 with the tractor so that in the event the implement is disconnected from the tractor the ram 60 is anchored to the tractor and is pulled away from the implement by continued movement of the tractor. The chain 110 and the hose connection 12 are of such lengths, respectively, that the ram 60 is pulled away from the implement by the chain 110 before the hose connection 12 becomes taut. Thus, the hose connection is protected from damage by the chain 110 and associated parts.

The quick detachable mounting for the ram unit 60 has advantages other than merely functioning as a safety device in the event of breakage of any of the hitch parts. For example, assume that the farmer desires to disconnect from the plow 15 and connect to some other implement, all that he has to do, so far as the ram unit 60 is concerned, is to manually swing the member 85 away from the front end of the slide strap 75 and lift the ram 60 out of the carrier 66. To facilitate supporting the ram unit with the tractor in moving the latter to another field of operation, I provide a hook 115 at any convenient point on the tractor, such as underneath the seat channel 116, so that the farmer may suspend the unit 60 from the hook 115 when moving to another field or up to another implement to be connected to the tractor. Essentially, therefore, the ram unit 60 is a part of the tractor notwithstanding the fact that means is provided on the implement for receiving the ram and permitting a direct connection from the latter to the implement parts to be controlled. The present invention therefore contemplates a line of implements, each of which is provided with a carrier 66 or the equivalent, whereby with one tractor and one ram unit 60, the various implements may be selectively connected with the tractor and controlled hydraulically from the tractor seat merely by operating the valve 11 of the tractor power unit 8, yet in every instance if the connection between the implement and the tractor should become released, either accidentally or intentionally, there is no possibility of the farmer breaking the hose connection by inadvertently driving the tractor away from the implement while the unit 60 is supported on the latter, for the chain 110 will immediately pull the unit 60 away from the implement without damage to any of the parts. If desired, the carrier 66 may also be moved with the tractor to its new location merely by unhooking the rod 92 from the clevis 91 and removing the pin 36 and the carrier 66 and reconnecting it to the drawbar of the tractor, as shown in Figure 5. To this end, it is preferable to provide means for holding the pivot pin 36 in position which is readily detachable, such as a cotter key 117 or some other form of quick detachable connection. Thus, applicant's carrier performs a triple function: First, it prevents breakage of the hose connection in the event the coupling pin breaks; second, it permits the convenient detachment of the ram unit from the implement, with or without the carrier, when it is desired to disconnect the implement from the tractor; and third, it prevents breakage of the hose connection in the event the implement is manually disconnected from the tractor but the ram unit inadvertently left mounted on the implement when the tractor is subsequently driven forward.

Mention was made above of the fact that according to the present invention means is provided for pulling the hydraulic ram unit off the implement in the event the coupling pin 36 breaks. Ordinarily, this is an exceedingly rare occurrence since it is not intended to serve in that manner as an overload release. However, if it is desired to provide an overload release, either a break pin, particularly constructed to break at a predetermined load, or a spring trip device may be used. Figure 6 shows the association of the present invention with an implement having a hitch including a break pin. The construction of the cylinder carrier and other parts is substantially the same as described above, and hence the same reference numerals have been used for identical parts. Referring now to Figure 6, the hitch 21 of the implement is connected to the tractor through a break pin 120, and the drawbar extension 33 is provided with an opening to receive a swivel pin 36a upon which the carrier 66 is, in this form of the invention, mounted for lateral movement. The pin 36a is secured in place by a removable pin or cotter key 117a. From this figure it will be seen that upon the occurrence of an overload sufficient to break the pin 120, the chain 110 acts to pull the ram unit 60 off the implement, thus preventing damage to the hose connection 12.

Figure 7 shows the association of the present invention with an outfit in which a spring trip in the form of a cushion spring release is provided. In this form of the invention the spring cushion release hitch is indicated in its entirety by the reference numeral 130 and is constructed substantially like that shown in U. S. Patent No. 2,271,748, issued February 3, 1942, to Carl G. Strandlund, to which reference may be made if necessary. Briefly, in this form of the invention the spring cushion hitch comprises a frame 131 in which a draft member 132 is mounted for longitudinal movement. The frame 131 includes a casting 133 through which the member 132 is slidable, and the forward end of the latter carries a rotatable draft hook member 134 which is provided with two or more lobes, each of which is formed with an abutting section adapted to remain in engagement with a portion of the casting 133 until the draft pull, transmitted to the member 134 by a link 137, reaches a point where the springs 138 are compressed and connect the member 132 to move forwardly to a point where the coupling member 134 is released. This immediately disengages the link 137 from the coupling member 134 and repositions the latter for subsequent reconnection to the link 137. Preferably, according to the present invention, the ram carrier 66 is mounted directly on the hitch of the implement on a swivel pin 117b which extends downwardly through openings in the frame 131 between the springs 138. This disposes the unit 60 in a position close to the pivot connection between the coupling member 134 and the link 137 whereby lateral swinging movement of the implement relative to the tractor will not cause any material displacement of the ram unit 60 relative to the tractor. In this form of the invention, if the load becomes excessive and the spring cushion release hitch trips, thus releasing the implement, a continued forward movement of the tractor acts through the chain 110 to pull the unit 60 off the implement, thereby preventing damage to the hose 12.

In the implement 15 shown in Figure 1, only one of the two necessary adjustments is controlled by power from the tractor power unit 8, such adjustment being the raising and lowering means, the leveling being accomplished by the hand lever 55. The present invention also contemplates providing hydraulic power means for effecting both a raising and lowering and a leveling by means of power derived from the tractor and transmitted through detachable piston and cylinder units both releasably connected with the implement and connected with the tractor by substantially inextensible means, whereby said units will be pulled away from the implement upon a disconnection of the implement from the tractor followed by further forward movement of the tractor.

Referring now more particularly to Figures 8–13, inclusive, the tractor in this form of the invention is substantially the same as that described above, and hence reference numerals indicating identical parts are the same as employed in Figure 1. In this form of the invention, however, there preferably are two hydraulic units 8 on the tractor each with a hose connection 12b or 12c; otherwise the tractors are of the same construction.

Referring now to Figures 8 and 9, the plow is indicated in its entirety by the reference numeral 15a and includes a pair of plow beams 151 and 152 to which are fixed plow bottoms 153 and 154.

The further ends of the plow beams 151 and 152 are connected by a brace 155 and right and left hand draft brackets 158 and 159 are fixed to the beams 151 and 152. A pair of crank axles 161 and 162 are connected for rocking movement with the beams 151 and 152 through apertured brackets 164 and 165. A pair of arms 166 and 167 are fixed, respectively, to the intermediate portions of the crank axles 161 and 162.

The implement 15a includes a hitch construction 171 which is similar to that described above. The hitch 171 includes a transverse apertured bar 172 connected by clevises 173 and 174 to the front ends of the draft brackets 158 and 159. The hitch 171 also includes a main longitudinally extending draft member 177 and the latter is connected by a brace 178 with the transverse hitch bar 172. The front end of the longitudinal hitch member 177 is formed so as to serve as a portion of a frame for a spring cushion release device indicated in its entirety by the reference numeral 181. Preferably, the hitch member 177 has its forward end formed with two vertically spaced sections 183 and 184, preferably similar to the frame of the hitch device shown in the Patent No. 1,919,915 to Carl G. Strandlund, issued July 25, 1933, to which reference may be made if necessary. A draft member 186 is slidable in the frame 183, 184 (Figure 10) and at its forward end carries a hook member 187, the latter being pivoted to the forward end of the draft member 186. Compression springs 188 are disposed between the sections 183 and 184 of the longitudinal frame bar 177 and are arranged to hold the draft member 186 in a rearward or retracted position, with the rear end of the draft hook 187 engaged in a longitudinally adjustable slide or sleeve 189. A clevis 191 connects the draft hook 187 with the drawbar 192 of the tractor.

A pair of lugs 201 and 202 are fixed, as by welding, to the edges of the hitch frame members 183 and 184 and the lugs have forward and upward inclined edges 204 and 205 which will be referred to later. A pair of piston and cylinder units 206 and 207 are connected to the rear ends of the hose connections 12b and 12c so that each receives power from the associated power unit 8 on the tractor. The forward end of each of the cylinder and piston units 206 and 207 is provided with a pair of attaching ears 208, and the ears of each pair are apertured to receive an attaching pin 210. The two cylinders 206 and 207 are connected to a transverse attaching member 211 which is best shown in Figure 11. The member 211 consists of a generally flat strap 212 having a pair of lugs 213 and 214 welded to the underside thereof. The forward edges of the lugs 213 and 214 are angled downwardly and rearwardly, as indicated at 215, and the ends of the strap member 212 are apertured, as at 217, to receive the connecting pins 210. Thus, through the attaching member 211, the two hydraulic piston and cylinder units 206 and 207 are connected together. A pair of chains 219 are connected at their forward ends with the clevis 191 and at their rear ends are connected through openings 221 to the opposite end portions of the member 211. The chains 219 therefore serve the same purpose in this form of the invention that the chain 110 serves in the form of the invention described above; that is, the chains 219 permanently connect the ram units 206 and 207 with the tractor through the clevis 191 and the drawbar 192.

In this form of the invention the pistons, which are indicated by the reference numerals 223 and 224, the former being shown in Figure 12, have a one-way telescopic connection with motion-reversing linkage that in turn is connected with the crank axle arms 166 and 167. Referring now more particularly to Figures 9 and 12, each of the pistons 223 and 224 are formed as hollow members in which a rod 226 is slidably or telescopically associated. The rear end of the rod is formed with a ball 227 that is received within a socket 228 of an associated lever. In Figure 9, the lever associated with the cylinder unit 206 is indicated by the reference numeral 231 and the lever associated with the other cylinder unit is indicated by the reference numeral 232. Preferably, these levers are mounted for rocking movement on a pivot 233 that is carried by the hitch member 177. A rod 235 is pivotally connected at its forward end with the outer end of the lever 231 and at its rear end is connected to the crank axle arm 166 (Figure 8). A second rod 236 is connected with the outer end of the other motion-reversing link 232 and at its rear end is connected with the arm 167 on the crank axle 162.

The operation of the form of the invention shown in Figures 8–13 is substantially as follows. The two interconnected hydraulic piston and cylinder units 206 and 207 with their attaching member 211 are mounted in place on the hitch 181 by disposing the transverse attaching member 211 with its inclined edges 215 against the corresponding edges 204 and 205 of the lugs 201 and 202 just ahead of the sleeve 189 and underneath the draft hook 187. After this is done then the sleeve 189 may be moved forwardly to engage the rear end of the draft hook 187 to retain the latter in draft transmitting relation. This also holds the attaching member 211 substantially rigidly on the hitch 181. Either of the ram units 206 and 207 may be actuated by opening the associated valve of the source of fluid pressure on the tractor, which then forces fluid under pressure into the selected cylinder. The extension of the piston of that cylinder then acts through the associated motion-reversing lever, 231 or 232, into the associated rod, 235 or 236, to shift the crank axle that is connected therewith. The other ram unit may be actuated in a similar manner. One of the rams is connected to raise the furrow wheel while the other is connected to raise the land wheel, and by operating both of the associated valves, both of the crank axles may be swung at the same time to raise the plow into a transport position.

If the implement should strike an obstruction, for example, sufficient to compress the springs of the hitch 181 and freeing the draft hook 187 from the sleeve 189, the tractor will be released from the implement and will then move forwardly. However, the chains 219 act through the transverse attaching bar 211 to pull the ram units 206 off the implement. It will be noted from Figures 10 and 11 that the edges 205, 204 and 215 are inclined. This is for the purpose of assuring that after the draft hook 187 has been swung out of normal position, as shown in Figure 13, the pull transmitted through the chains 219 will have a component tending to raise the member 211 off of the lugs 201 and 202, and when the member 211 is thus disengaged from the lugs 201 and 202, the cylinders 206 and 207 move away from the implement, and in doing so the rods 226 are pulled out of the associated pistons 223 and 224. Thus, the hose connections 12b and 12c are protected from damage, even if the tractor is driven away from the implement following the release of the latter, as by an overload. Figure 13 illustrates the relations between the parts immediately after the implement has been detached from the tractor. From the above description it will be seen that the member 211 and the two levers 231 and 232 are similar in function to the ram-receiving sections 71 and 76 and that they also form means receiving the rams 206 and 207 in detachable relationship. In this form of the invention it is a simple matter to reconnect the rams 206 and 207 after a release. All that it is necessary to do is to insert the rods 226 in the pistons 223 and 224 and then replace the member 211 on the hitch 181. Following this, the draft hook 187 may then be reengaged with the tractor clevis 191.

While I have shown and described above the preferred forms, it is to be understood that my invention is not to be limited to the particular details shown and described above but that, in fact, widely different means may be used in the practice of the broader aspects of my invention.

What I claim, therefore, and desire to secure by Letters Patent is:

1. The combination of a tractor having a source of fluid pressure, an implement having a part adapted to be shifted from one position to another and including hitch means releasably connecting the implement with the tractor, a fluid pressure operated unit adapted to be connected to shift said implement part, means releasably supporting said unit on said hitch means, and means connecting said unit with the tractor whereby, when said implement is released from said tractor, said unit is also released from said implement hitch means and said implement part.

2. The combination of a tractor having a source of fluid pressure, an implement having a part to be moved from one position to another, a hitch member connecting said implement with the tractor and swingable laterally relative to the tractor, a cylinder and piston unit, means mounting said unit for movement on said hitch member, means connecting said unit with said implement part, and a flexible fluid conduit extending from said unit to said source of fluid pressure on the tractor.

3. The combination of a tractor having a source of fluid pressure, an implement adapted to be connected with the tractor and having frame means and a part to be moved relative to the frame means from one position to another, a pair of relatively movable members normally supported on the implement and having ram-receiving portions, a ram unit adapted to be supported on said ram-receiving portions, a connection reacting against said frame means and extending from said unit to said implement part whereby extension of said unit moves said part in one direction, a flexible fluid conduit extending from said source of pressure on the tractor to said unit on the implement, a latch member normally holding said unit in position on said ram-receiving portions, and a connection separate from said fluid conduit and extending from said latch member to the tractor, said separate connection being shorter in effective length than said fluid conduit whereby if the tractor should be driven away from the implement when the latter is disconnected from the tractor, the ram unit will be removed from said sections without damaging said fluid conduit.

4. The combination with a tractor having a source of fluid pressure, of an implement adapted to be connected with the tractor and to be released therefrom and including a part to be controlled, a spring release device connecting said implement with the tractor and including a part movable from one position to another upon the occurrence of an overload to thereby release the implement from the tractor, a cylinder and piston unit mounted on the implement and releasably connected with said implement part, a flexible hose connecting said unit with said source of fluid pressure on the tractor, a member releasably associated with said spring release device and connected with said unit to receive the reaction thereof when the latter is operated to move said implement part, means whereby said spring release part holds said member in a position whereby said unit is operative to control said implement part, and means connected between said member and the tractor for pulling said unit away from the implement when said spring release part is moved into a released position releasing the implement from the tractor and releasing said member.

5. In an agricultural implement having a part to be adjusted, a ram carrier comprising a pair of relatively slidable parts, each having a ram-receiving hook portion, a ram adapted to be seated in and supported by said hook portions, and a connection from one of said slidable parts to said implement part, and means for releasably holding a ram in said hook portion.

6. In an agricultural implement having a part to be adjusted, a ram carrier comprising a pair of relatively slidable bars, each having an upturned end, a ram mounted on said upturned ends, means mounting said bars on the implement for lateral swinging movement, so as to provide for lateral swinging movement of said ram, and a connection from one of said bars to said implement part.

7. In an agricultural implement having a part to be adjusted, a ram carrier comprising a pair of relatively slidable members, means pivotally mounting one of said members on the implement, means slidably supporting the other of said slidable members on said one member, a ram carried by said members, and means connecting said other member with said implement part.

8. In an agricultural implement having a part to be adjusted, a ram carrier comprising a pair of relatively slidable parts adapted to be disposed generally longitudinally of the implement, one of said parts extending generally rearwardly and the other of said parts extending generally forwardly, means anchoring the forward end of said rearwardly extending part with the implement, tension means connecting the rear end of the other part with said implement part, and a ram carried by said relatively slidable parts in a position whereby extension of the ram causes forward movement of said other part.

9. The combination set forth in claim 8, further characterized by said ram having at its rear end a one-way connection with said rearwardly extending part and a releasable connection with the forwardly extending part.

10. In an implement adapted to be propelled by a tractor and having a part to be adjusted, a ram carrier comprising a pair of relatively slidable parts adapted to be disposed generally longitudinally of the implement, one of said parts extending generally rearwardly and the other of said parts extending generally forwardly, means anchoring the forward end of said rearwardly extending part with the implement, tension means connecting the rear end of the other part with said implement part, a ram carried by said relatively slidable parts in a position whereby extension of the ram causes forward movement of said other part, and a direct pull-off connection between said cylinder and the tractor.

11. An implement comprising two parts adapted to be controlled, a hitch structure including a member movable into a released position, a pair of motion-reversing levers operatively connected, respectively, with said implement parts, a pair of piston and cylinder units detachably connected with said motion-reversing levers, a member to which said units are anchored, and means for mounting said last-mentioned member on said hitch structure in a position to be released therefrom upon the movement of said hitch member into its released position.

12. An agricultural implement comprising a part to be controlled, a hitch structure including a member movable from a draft-transmitting position into an implement-releasing position upon the occurrence of an overload, a piston and cylinder unit detachably connected with said implement part for operating the latter, and means including said member for releasably connecting said piston and cylinder unit with said hitch structure whereby movement of said member into its released position automatically disconnects said unit from said hitch structure.

13. The combination of a tractor having a source of fluid pressure, an implement having two parts adapted to be controlled, a hitch structure connected with an implement and including a member movable into a released position, in response to the occurence of an overload, for releasably connecting said hitch structure and said implement to said tractor, a pair of lugs carried by said hitch structure and having inclined portions, a member having sections also formed with inclined portions, said member being disposed against said lugs and in a position to be held therein by said releasable hitch member, a pair of piston and cylinder units connected to react against said second mentioned member for controlling said implement parts, a pair of flexible hose connections extending from said source of fluid pressure on the tractor to said units, and means having an effective length shorter than either of said hose connections for connecting said second mentioned member with the tractor whereby, upon the occurrence of an overload and the movement of said hitch member into a released position, said second member is pulled in a direction to cause said inclined sections to disengage, thereby releasing both of said piston and cylinder units from said implement.

14. The combination of a tractor having a source of power, an implement releasably connected with the tractor and having a part to be moved from one position to the other, a power unit deriving energy from said source of power releasably mounted on the implement, tension means connecting said power unit with said part and including a releasable section, latch means against which said power unit reacts in exerting a pull through said tension means against said part; and an anchoring connection extending between said power unit and the tractor and operative to retain the power unit with the tractor when the power unit is released from the implement.

15. The combination with a tractor having an apertured drawbar and a controllable source of fluid pressure, a pivot pin in the aperture of said drawbar, a ram carrier on said pin and having longitudinally spaced apart sections receiving opposite ends of said ram, and a ram having a fluid conduit connection with said source supported on said carrier.

16. In combination, a tractor having a power unit, an implement having an adjustable part, a lever pivoted between its ends on a generally vertical axis on the implement and connected at one end with said adjustable part, a fluid-power device mounted on the implement and connected with the other end of said lever to actuate the latter and said part, and means connecting the fluid-power device with the tractor power unit.

17. The combination of a propelling vehicle, a propelled vehicle, the former having a source of pressure and the other having a part adapted to be moved from one position to another, disconnectible means connecting said vehicles for generally lateral movement about a hitch pivot, a piston and cylinder device, a fluid conduit connecting said source of pressure with said device, means releasably mounting said device on the forward portion of said other vehicle and adjacent the rear portion of said propelling vehicle and said hitch pivot and in operative but releasable connection with said part, and means separate from said fluid conduit and connected between said propelling vehicle and said device separately from said fluid conduit, said separate connecting means being connected with said piston and cylinder device adjacent said hitch pivot, whereby said separate connecting means readily accommodates movement of one vehicle relative to the other about said hitch pivot, said separate connecting means having an effective length shorter than said fluid conduit for connecting said device with said propelling vehicle, whereby when said vehicles are separated said device is held in connected relation with said propelling vehicle when the propelled vehicle is separated therefrom.

FRANK T. COURT.